(12) United States Patent
Brunner (10) Patent No.: US 10,653,274 B2
(45) Date of Patent: May 19, 2020

(54) METHOD AND MECHANISM FOR NON-ROTATIONAL ASSEMBLY OF A BLADE ASSEMBLY TO A VESSEL

(71) Applicant: SharkNinja Operating LLC, Newton, MA (US)

(72) Inventor: Charles Stewart Brunner, North Reading, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 236 days.

(21) Appl. No.: 15/605,317

(22) Filed: May 25, 2017

(65) Prior Publication Data

US 2017/0340170 A1 Nov. 30, 2017

Related U.S. Application Data

(60) Provisional application No. 62/341,202, filed on May 25, 2016.

(51) Int. Cl.
*A47J 43/07* (2006.01)
*B65D 81/20* (2006.01)
*B65D 81/38* (2006.01)
*B65D 45/24* (2006.01)
(Continued)

(52) U.S. Cl.
CPC ......... *A47J 43/0722* (2013.01); *A47J 43/046* (2013.01); *A47J 43/0716* (2013.01);
(Continued)

(58) Field of Classification Search
CPC .. A47J 43/0722; A47J 43/046; A47J 43/0716; A47J 43/04; A47J 43/0727; A47J 43/27; B65D 45/24; B65D 45/20; B65D 45/22; B65D 45/16; B65D 45/025; B65D 45/02; B65D 45/34; B65D 81/2038; B65D 81/3834; B65D 1/0253; B65D 1/023; B02C 18/12
(Continued)

(56) References Cited

U.S. PATENT DOCUMENTS 244,846 A * 7/1881 Bruening ............... B65D 45/24
215/284
1,451,768 A 4/1923 Falls
(Continued)

FOREIGN PATENT DOCUMENTS

WO 2016007997 A1 1/2016

OTHER PUBLICATIONS

PCT International Preliminary Report on Patentability; International Application No. PCT/US2017/034182; International Filing Date: May 24, 2017; dated Nov. 27, 2018; pp. 1-7.
(Continued)

*Primary Examiner* — Robert J Hicks
(74) *Attorney, Agent, or Firm* — Cantor Colburn LLP (57) ABSTRACT

A cap for closing a container including a cap body for contacting an open end of the container and at least one connector mounted to an exterior of the cap body for coupling the cap body to the container. The at least one connector includes an engaging piece and a lever. An initial movement of the at least one connector causes the engaging piece to contact the container and a further movement of the at least one connector causes the engaging piece to affix the cap body to the container.

16 Claims, 8 Drawing Sheets

(51) Int. Cl.
*A47J 43/27* (2006.01)
*A47J 43/04* (2006.01)
*B02C 18/12* (2006.01)
*B65D 45/20* (2006.01)
*A47J 43/046* (2006.01)

(52) U.S. Cl.
CPC ........... *A47J 43/0727* (2013.01); *A47J 43/27* (2013.01); *B02C 18/12* (2013.01); *B65D 45/20* (2013.01); *B65D 45/24* (2013.01); *B65D 81/2038* (2013.01); *B65D 81/3834* (2013.01)

(58) Field of Classification Search
USPC .... 215/284, 280, 273, 44, 43; 220/321, 320, 220/319, 315, 326, 324
See application file for complete search history.

(56) References Cited

U.S. PATENT DOCUMENTS

| | | | | |
|---|---|---|---|---|
| 1,466,606 | A * | 8/1923 | Trageser | E05C 19/14 220/326 |
| 1,641,681 | A * | 9/1927 | Kircher | A47J 36/10 220/324 |
| 1,948,263 | A * | 2/1934 | Green | B65D 45/24 220/326 |
| 2,446,661 | A * | 8/1948 | Murdock | B65D 39/12 215/303 |
| 2,510,671 | A | 6/1950 | Verheyden | |
| 2,543,822 | A * | 3/1951 | Barrington | B65D 45/16 215/284 |
| 2005/0056651 | A1 | 3/2005 | Gibney | |
| 2006/0007779 | A1 | 1/2006 | Fernandez et al. | |

OTHER PUBLICATIONS

PCT ISR Written Opinion; International Application No. PCT/US2017/034182; International Filing Date: May 24, 2017; dated Aug. 14, 2017; pp. 1-7.

PCT Notification of Transmittal of International Search Report; International Application No. PCT/US2017/034182; International Filing Date: May 24, 2017; dated Aug. 14, 2017; pp. 1-5.

* cited by examiner

METHOD AND MECHANISM FOR NON-ROTATIONAL ASSEMBLY OF A BLADE ASSEMBLY TO A VESSEL

CROSS REFERENCE TO RELATED APPLICATIONS

This application claims the benefit of U.S. Provisional Application No. 62/341,202, filed May 25, 2016, the content of which is incorporated by reference in its entirety herein.

BACKGROUND

This application is directed to a food processor, and more particularly, to an assembly configured to associate an attachment with a food processor base.

Food processors, such as blenders generally include containers or multi-sized containers or jars mountable to a base unit. These containers are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Typically, a cutting assembly threadably attaches to an end of the container. However, the rotary motion required to couple the cutting assembly to the container may stretch or deform a seal arranged between the components, resulting in the processed food items within the container leaking through the seal, as well as uncertainty for a user whether the cutting assembly is properly engaged with the container. Further, inclusion of threads on both the cutting assembly and the container adds not only complexity, but also cost to the food processor.

SUMMARY

According to one embodiment, a cap for closing a container including a cap body for contacting an open end of the container and at least one connector mounted to an exterior of said cap body for coupling said cap body to the container. The at least one connector includes an engaging piece and a lever. An initial movement of said at least one connector causes said engaging piece to contact the container and a further movement of said at least one connector causes said engaging piece to affix said cap body to the container.

In addition to one or more of the features described above, or as an alternative, further embodiments when the cap is attached to the container, said cap body seals said open end of the container.

In addition to one or more of the features described above, or as an alternative, further embodiments said connector is rotatable about an axis oriented generally perpendicular to the container.

In addition to one or more of the features described above, or as an alternative, further embodiments said lever is operably coupled to said engaging piece such that rotation of said lever causes a similar rotation of said engaging piece.

In addition to one or more of the features described above, or as an alternative, further embodiments said engaging piece includes a flange and said flange has a contoured surface complementary to an exterior surface of the container.

In addition to one or more of the features described above, or as an alternative, further embodiments said flange is integrally formed with said lever.

In addition to one or more of the features described above, or as an alternative, further embodiments said flange is indirectly connected to said lever via a linkage.

In addition to one or more of the features described above, or as an alternative, further embodiments said flange is pivotally mounted to said lever.

In addition to one or more of the features described above, or as an alternative, further embodiments said contoured surface of said flange extends about ninety degrees of a periphery of the container.

In addition to one or more of the features described above, or as an alternative, further embodiments said engaging piece is configured to abut a lip formed about the container.

In addition to one or more of the features described above, or as an alternative, further embodiments said cap body has a size and shape similar to said first end of the container.

According to another embodiment, a food processing system includes a food processing base, a container having a first open end and a second closed end, and a cutting assembly connectable to said first open end of the container. The cutting assembly is mountable to the food processing base to associate the container with the food processing base. The cutting assembly includes a body for contacting said open end of the container and at least one connector mounted to an exterior of said body for coupling said body to said container. The at least one connected includes an engaging piece and a lever. An initial movement of said at least one connector causes said engaging piece to contact the container and a further movement of said at least one connector causes said engaging piece to affix said body to the container.

In addition to one or more of the features described above, or as an alternative, further embodiments said connector is rotatable about an axis oriented generally perpendicular to the container.

In addition to one or more of the features described above, or as an alternative, further embodiments said engaging piece includes a flange and said flange has a contoured surface complementary to an exterior surface of said container.

In addition to one or more of the features described above, or as an alternative, further embodiments said contoured surface of said flange extends about ninety degrees of a periphery of said container.

In addition to one or more of the features described above, or as an alternative, further embodiments when said cutting assembly is coupled to said container, said engaging piece is configured to abut a lip formed about the container.

In addition to one or more of the features described above, or as an alternative, further embodiments said lever is operably coupled to said engaging piece such that rotation of said lever causes a similar rotation of said engaging piece.

In addition to one or more of the features described above, or as an alternative, further embodiments said cutting assembly further includes at least one blade rotatable about an axis mounted to said body, said at least one blade being positioned within said container when said cutting assembly is coupled to said container.

In addition to one or more of the features described above, or as an alternative, further embodiments rotation of said at least one blade is driven by said food processing base.

BRIEF DESCRIPTION OF THE FIGURES

The accompanying drawings incorporated in and forming a part of the specification embodies several aspects of the present disclosure and, together with the description, serves to explain the principles of the disclosure. In the drawings.

The detailed description explains embodiments of the present disclosure, together with advantages and features, by way of example with reference to the drawings.

DETAILED DESCRIPTION

Figure 1:
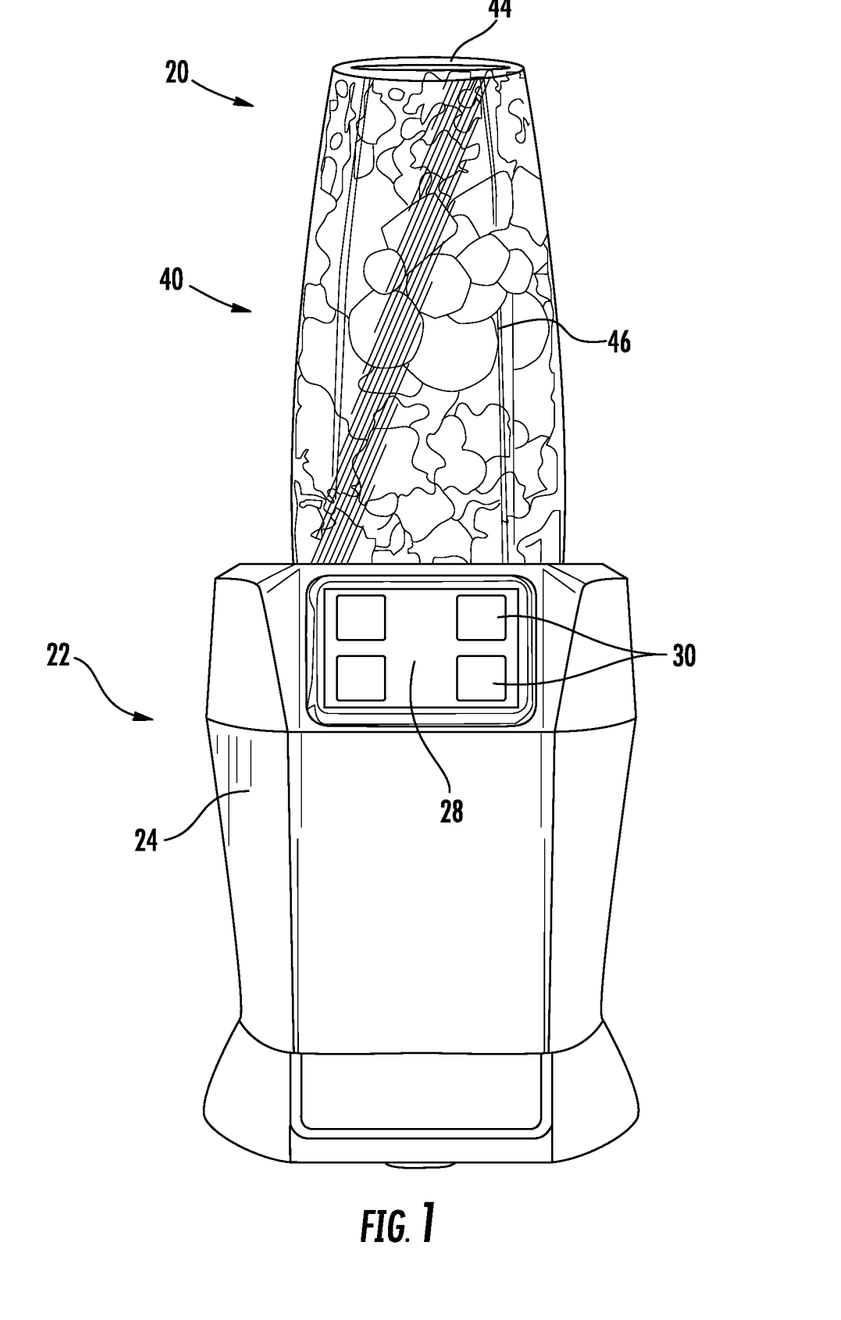
FIG. 1 is a front view of an example of a food processing system.

Referring now to the FIG. 1, an example of a multifunctional food processing system 20 is illustrated in more detail. In general, the food processing system 20 can be adapted to perform any food processing or blending operation including as non-limiting examples, dicing, chopping, cutting, slicing, mixing, blending, stirring, crushing, or the like. Although the food processing system 20 illustrated and described herein is a personal blender system, other food processing systems are within the scope of the present disclosure. The food processing 20 system includes a base 22 having a body or housing 24 within which a motorized unit (not shown) and at least one controller (not shown) are located. The base 22 includes at least one rotary component, such as a drive coupler (not shown) for example, driven by the motorized unit within the body 24. The base 22 additionally includes a control panel or user interface 28 with one or more input devices 30 for turning the motorized unit on and off and for selecting various modes of operation, such as pulsing, blending, or continuous food processing. The drive coupler (not shown) is configured to engage a portion of an attachment coupled to the base 22 for the processing of food products located within an interior of the attachment. This will become more apparent in subsequent FIGS. and discussion.

Figure 2:
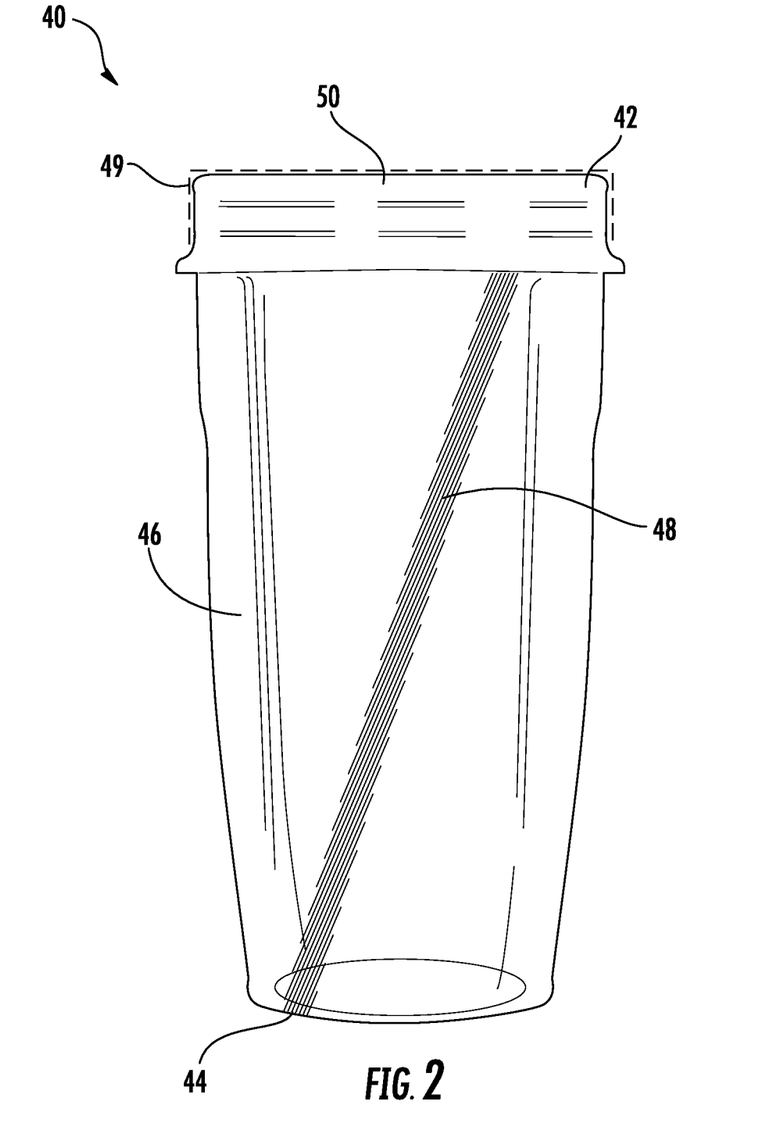
FIG. 2 is a front view of a container configured for use with a food processing system.

A plurality of interchangeable attachments varying in size and/or functionality may be configured for use with the base 22. For example, in FIGS. 1 and 2, the attachment connected to the food processor base 22 is a clear plastic container sized to hold one or more servings of a processed food therein. The container 40 generally includes a first end 42, a second end 44, and one or more walls 46 extending there between to define an interior chamber 48 within which food products are placed and processed. As best shown in FIG. 2, the first end 42 of the container 40 includes an opening 50 that provides access for the one or more food items into the chamber 48. The second end 44 is generally closed such that food products contained within the chamber 48 are unable to escape through the second end 44. Another component, 49 illustrated schematically in broken lines in FIG. 2 may be configured to attached to the first end 42 of the container 40 and is used to associate or couple the container 40 with the base 22.

Referring now to FIGS. 3-11, a cutting assembly 60 is configured to associate the container 40, or another of the plurality of interchangeable attachments, with the base 22. The cutting assembly 60 is removably connected to the first, open end 42 of the container 40. When the cutting assembly 60 is attached to the container 40, the cutting assembly 60 seals the first end 42 of the container 40 such that the food products contained within the chamber 48 are unable to escape therefrom. The cutting assembly 60 may be formed from any suitable food safe material such as plastic for example. The cutting assembly 60 includes a body or base 62 having a shape and size generally complementary to the first end 42 of the container 40. In an embodiment, best shown in FIGS. 5 and 7, a recess or cavity 64 is formed in a first side 66 of the base 62 and extends about a periphery thereof such that the first end 42 of the container 40 is received within the cavity 64. As best shown schematically in FIGS. 7, and 9, a spindle 70 rotatable about an axis A extends from the first surface 66 of the base 64 into the chamber 48 of the container 40. A blade assembly 72 including one or more blades 74 is mounted to and extends radially outward at an angle from the spindle 70. Rotation of the spindle 70 and blade assembly 72 about axis A, driven by engagement with the drive coupler of the base 22, is configured to process one or more food items within the container 40. It should be understood that embodiments where the cutting assembly 60 does not include the spindle 70 or blade assembly 72, such as when the cutting assembly is a cap for example, are also considered within the scope of the disclosure.

Mounted about an exterior surface of the base 62 of the cutting assembly 60 are one or more connectors 80 configured to engage the container 40 and couple the container 40 to the cutting assembly 60. Although two connectors 80 are illustrated in each of the embodiments, it should be understood that embodiments having any number of connectors 80 are within the scope of the disclosure. Further, although each connector 80 within an embodiment is substantially identical, embodiments including different connectors are also considered within the disclosure.

Each connector 80 includes a lever 82 pivotally mounted to the exterior of the base 62. The lever 82 is rotatable about a horizontal axis, arranged substantially perpendicular to the axis A of the spindle 70. In the non-limiting embodiment illustrated in FIG. 3, each lever 82 includes a flange 84 having a contoured surface 86 generally complementary to an exterior of the container 40. Although the flanges 84 are illustrated as having a width greater than that of the levers 82, embodiments where the flanges 84 have a width equal to or less than the levers 82 are also considered within the scope of the disclosure. In an embodiment, the flanges 84 and contoured surfaces 86 are sized to wrap about at least a quarter (ninety degrees) of the periphery of the container 40. The end 90 of the lever 82 adjacent the base 62 is coupled thereto via a linkage 88 such that the lever 82 is movable between a plurality of positions.

Figure 3:
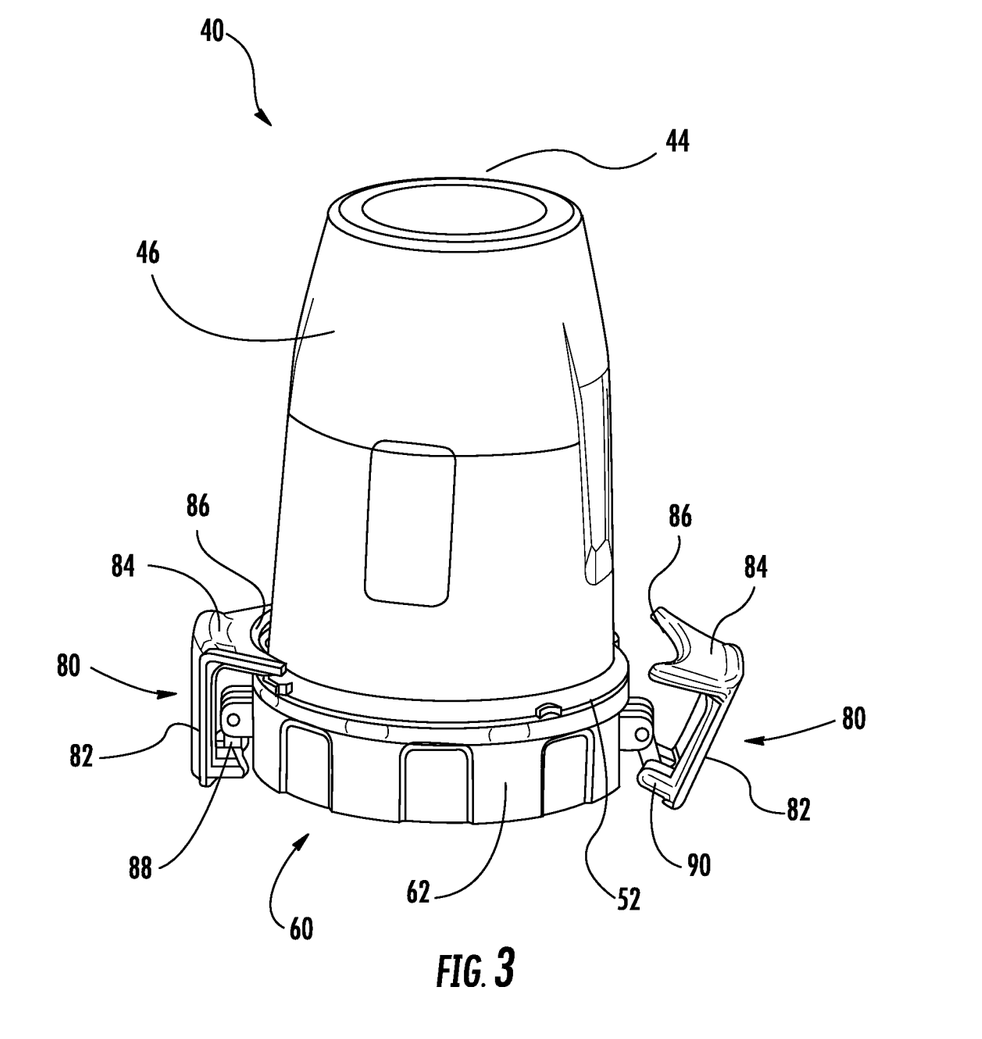
FIG. 3 is a perspective view of a cutting assembly configured to couple to a container according to an embodiment.

In an embodiment, each of the connectors 80 is configured as an "over-center latch." Once the base 62 is arranged in contact with the first end 42 of the container 40, each lever 82 is pivoted towards the container 40 causing the contoured surface 86 of each lever 82 to engage the exterior surface of the container 40. The force applied to the flanges 84 via contact with the container 40 is distributed evenly across surface 86 due to the complementary shape of the surface 86 relative to the container 40. In an embodiment, a lip 52 is formed about the periphery of the container 40 such that the flange 84 is positioned directly adjacent the lip 52. To restrict movement of the container 40 relative to the base 62, the ends 90 of the levers 82 are rotated towards the base 62 such that the linkage 88 is arranged generally vertically. This rotation causes the flange 84 to apply a force to the lip 52 in the direction of the base 62. As the flanges 84 contact the lip 52 of the container, a force, and more specifically a moment, is created that resists further rotation of the lever 82 towards the container 40. As the lever 82 is rotated further and approaches its limit, the moment on the lever 82 changes due to the flange 84, thereby promoting further rotation of the lever 82 about an axis to create a seal between the container 40 and the cutting assembly 60. The lever 82 is configured to rotate towards the container 40 until it contacts an exterior surface thereof. As a result, movement of the container 40 relative to the cutting assembly 60 is restricted by the clamping pressure created via engagement of the flanges 84 with the lip 52 of the container 40.

Figure 4:
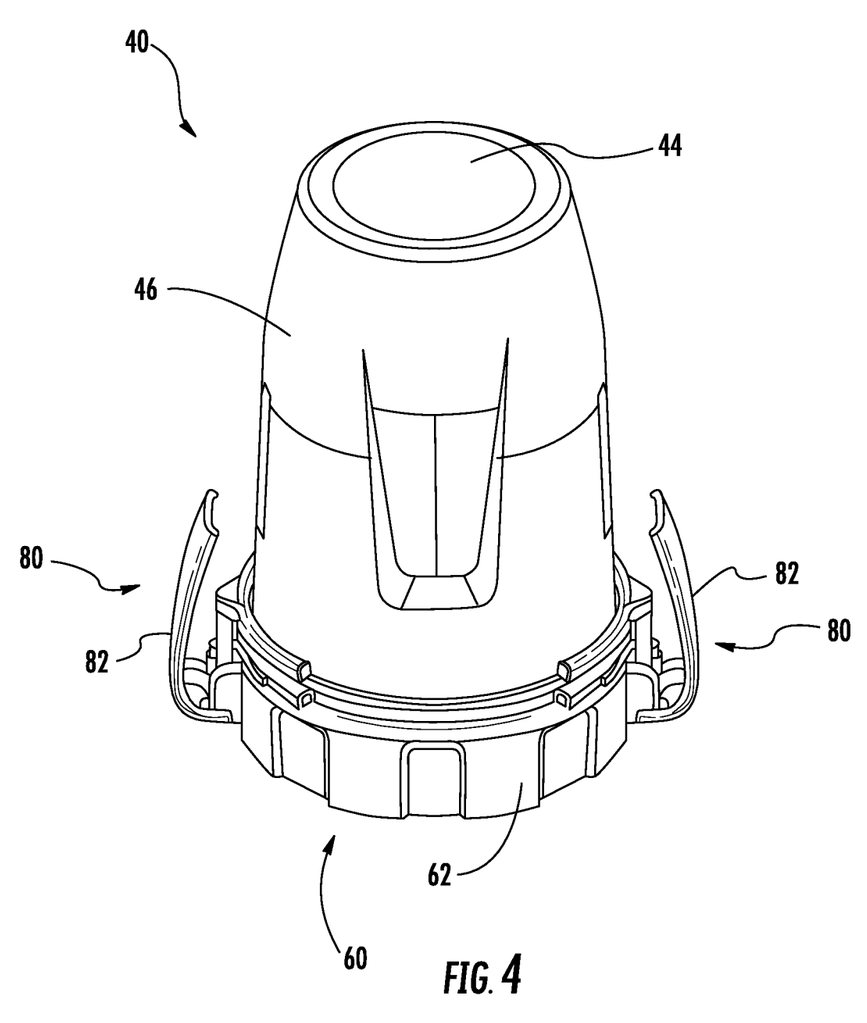
FIG. 4 is a perspective view of another cutting assembly configured to couple to a container according to an embodiment.
Figure 5:
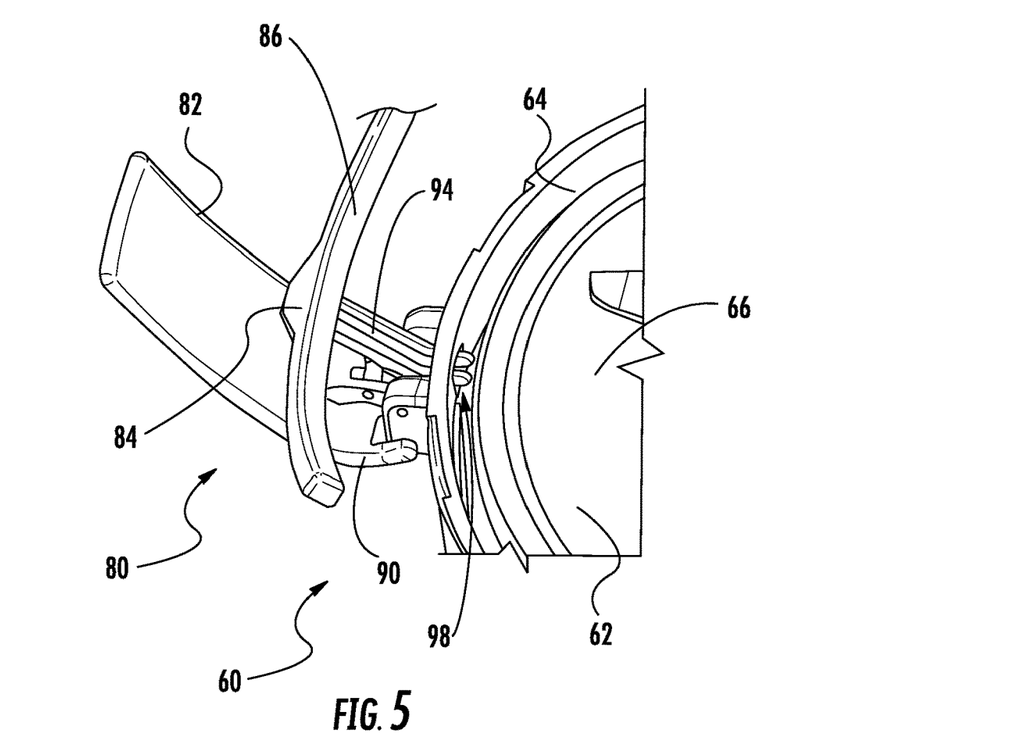
FIG. 5 is a perspective view of connector of the cutting assembly of FIG. 4 according to an embodiment.
Figure 6:
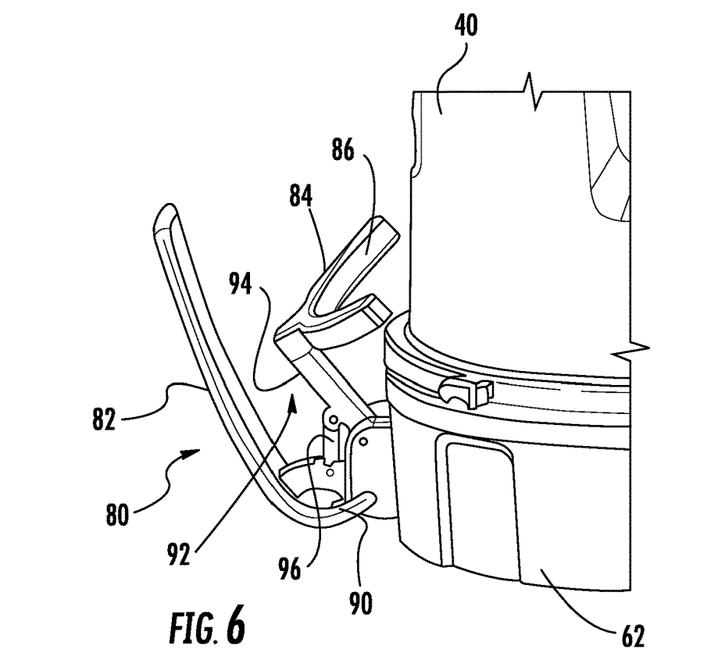
FIG. 6 is a side perspective view of connector of the cutting assembly of FIG. 4 according to an embodiment.
Figure 7:
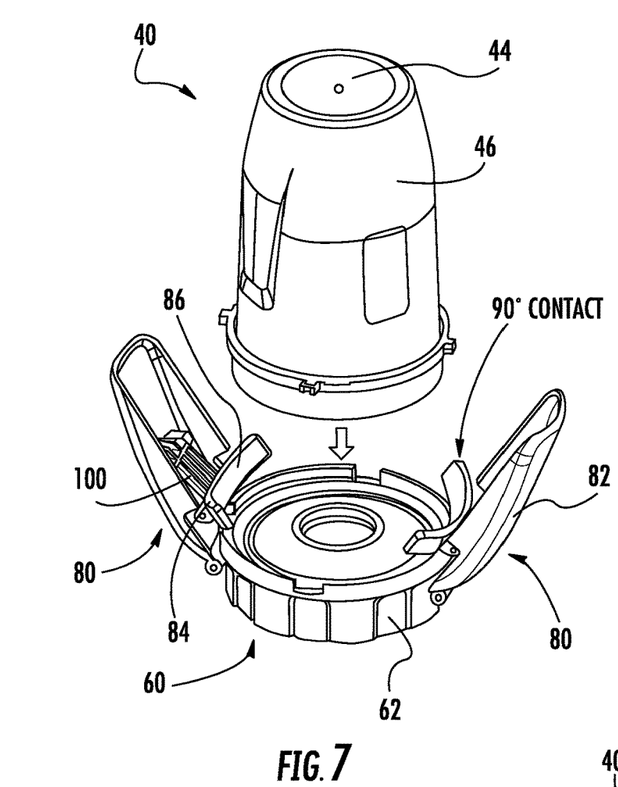
FIG. 7 is a perspective view of a configured to couple to a container according to an embodiment.
Figure 8:
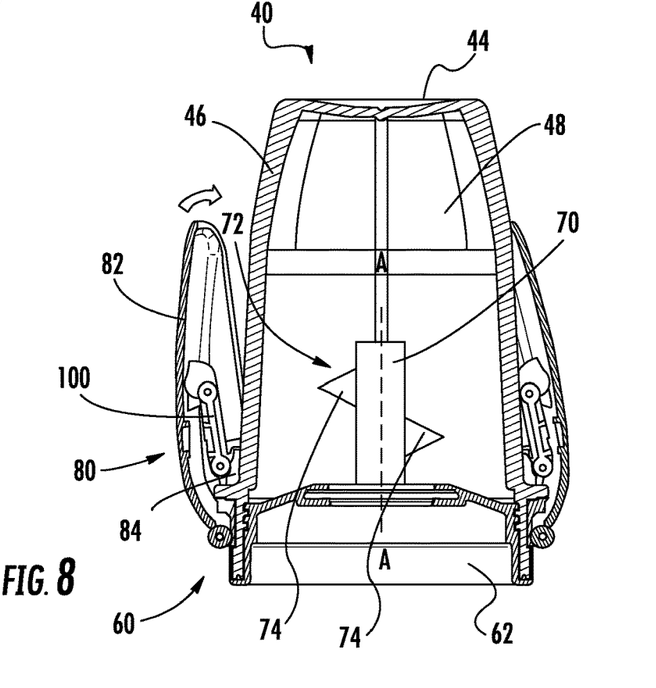
FIG. 8 is a cross-sectional view of the cutting assembly and container of FIG. 7 according to an embodiment.
Figure 9:
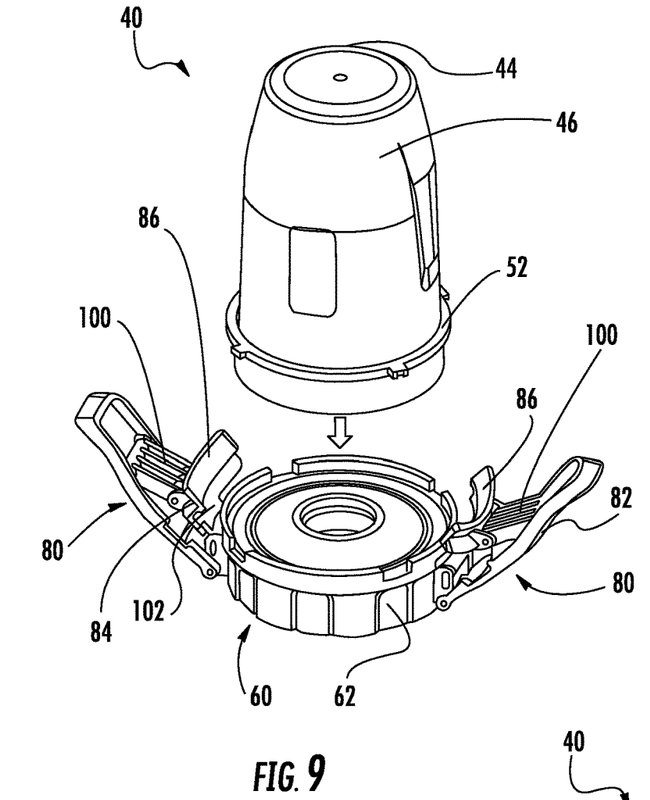
FIG. 9 is a perspective view of another cutting assembly configured to couple to a container according to an embodiment.
Figure 10:
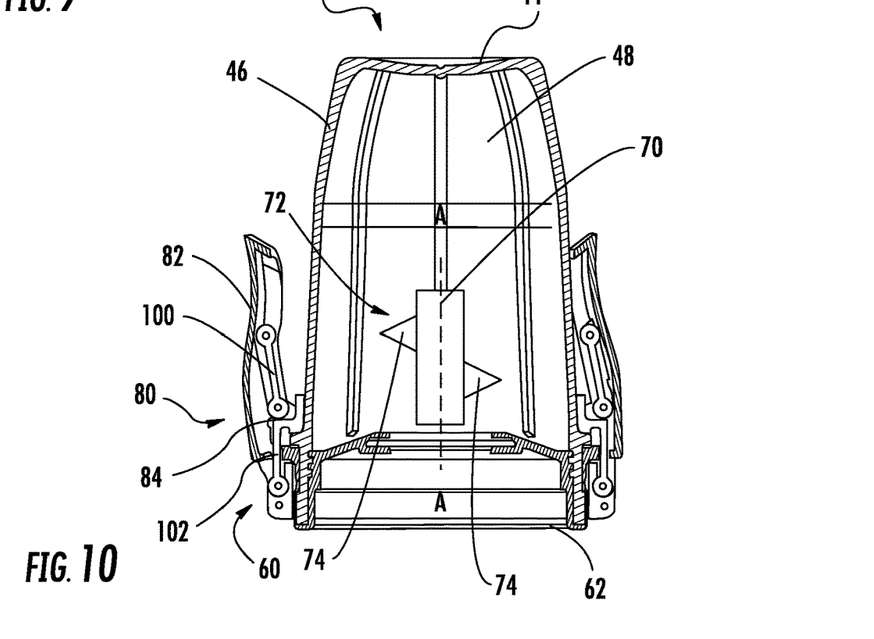
FIG. 10 is a cross-sectional view of the cutting assembly and container of FIG. 9 according to an embodiment.

With reference to FIGS. 4-6, an end 90 of each lever 82 may be pivotally mounted to the base 62. In addition, the flanges 84 having a contoured surface 86 configured to contact the container 40 may be formed as a component 92 separate from the levers 82. The yoke 92 includes a support member 94 arranged substantially perpendicular to the flange 84. As shown, the support member 94 is pinned to a portion of the base 62 and is coupled to a corresponding lever 82 via a linkage 96. When the cutting assembly 60 is disconnected from the container 40 and the levers 82 are pivoted open, as shown in FIG. 5, the free end 98 of the support member 94 is configured to extend through a side of the base 62 into the cavity 64. Installation of the first end 42 of the container 40 into the cavity 64 engages the free end 98, causing the yoke 92, and therefore the lever 82, to pivot towards the container 40 (see FIG. 6). Further rotation of the levers 82 causes the contoured surface 86 of the flange 84 to contact the exterior of the container 40, such as abutting lip 52 for example. Even further rotation of the free end of the lever 82 towards the container 40 creates a compressive force which causes the flanges 84 to clamp tightly against the container 40, to restrict movement and create a seal between the container 40 and the cutting assembly 60. This further rotation results in the free end of the levers 82 being disposed between an exterior surface of the container 40 and between a position substantially aligned with the rotational axis of the lever 82. In some embodiments, the further rotation of the levers 82 additionally creates a vertical force applied to the yoke 92, and transmitted to the lip 52. In an embodiment, the rotational axis of the level 82 is positioned such that when the lever 82 is fully rotated, the compressive force created between the lip 52 and the flange 84 drives the lever 82 to a greater state of closure.

In yet another embodiment, shown in FIGS. 7-10, each flange 84 is pivotally connected to a corresponding lever 82 via a linkage 100. In the illustrated, non-limiting embodiment, the linkage 100 extends from a central portion of the lever 82 towards the base 62 such that the flange 84 is disposed generally adjacent the first surface 66 of the base 62. In one embodiment, the flange 84 is indirectly coupled to the base 62 via the linkage 100 and lever 82. In another embodiment, illustrated in FIGS. 9-10, the flange 84 may also be directly coupled to the base 62. As shown, a portion 102 of the flange 84 is oriented parallel to and offset from the contoured surface 86 and is pivotally connected to the base 62. When the cutting assembly 60 is affixed to the container 40, portion 102 of the flange 84 is arranged in overlapping contact with an exterior surface of the base 62.

Once the first end 42 of the container 40 is aligned and arranged in an overlapping configuration with the base 62, such as when the first end 42 is inserted within cavity 64 for example, partial rotation of the levers 82 pivots the contoured surface 86 of the flange 84 into contact with the exterior of the container 40. The levers 82 are configured to rotate towards the container 40, even after the flange 84 is arranged in contact a surface of the container 40. Further rotation of the levers 82 towards the container 40 increases the compressive force applied to the container 40 via the flanges 84, thereby forming a seal and restricting movement of the container 40 relative to the cutting assembly 60. At a final point of rotation of the lever 82, the force of compression decreases slightly as the lever 82 rotates over center and the compressive force drives the flange 84 of the lever 82 into contact with the side of the container 40.

Figure 11:
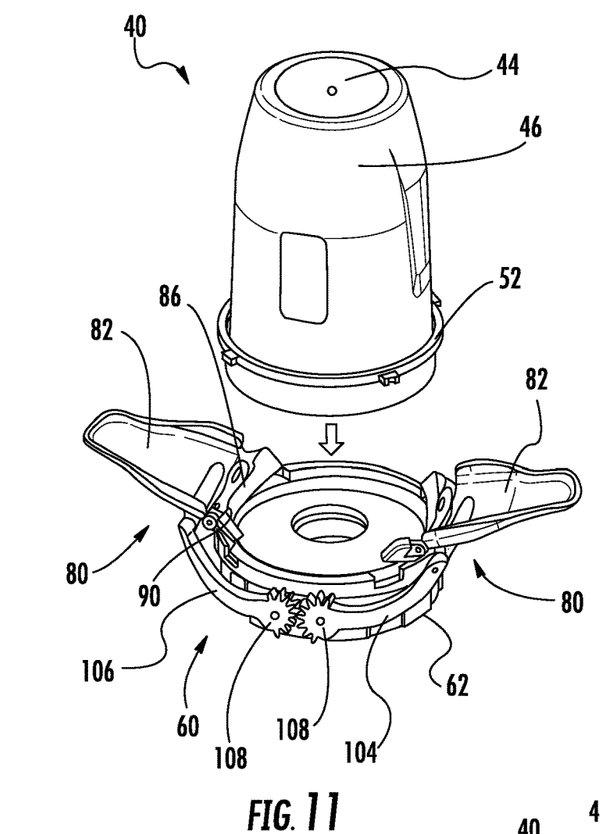
FIG. 11 is a perspective view of another cutting assembly configured to couple to a container according to an embodiment.
Figure 12:
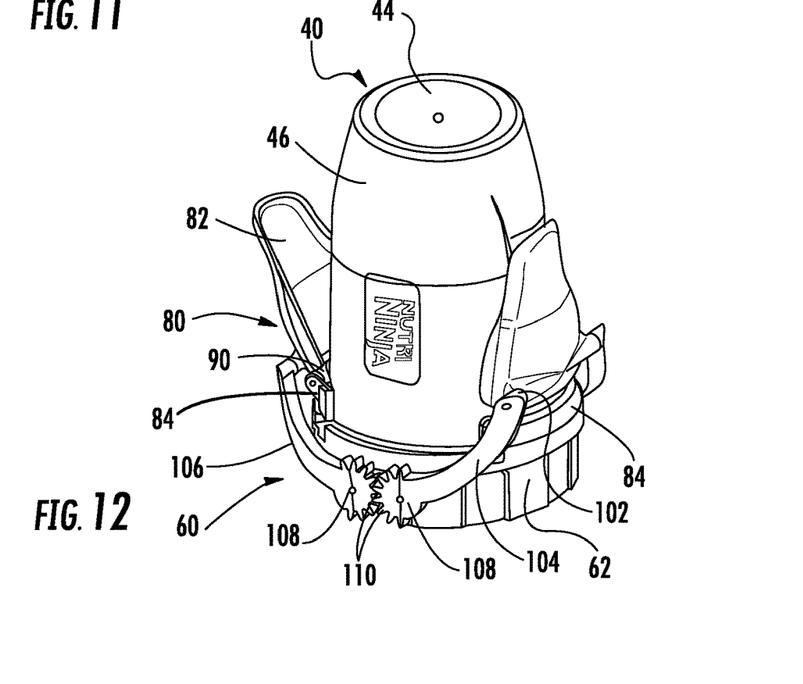
FIG. 12 is another perspective view of the cutting assembly of FIG. 11 according to an embodiment.

In yet another embodiment, illustrated in FIGS. 11 and 12, each flange 84 is pivotally mounted to an end 90 of a corresponding lever 82. Each lever 82 is configured to rotate about a connection member 102 having a first arm 104 disposed adjacent a first side of the base 62 and a second, similar arm 106 disposed adjacent a second, opposite side of the base 62. The end 108 of each arm 104, 106 of a connection member 102 is rotatable about an axis and includes a plurality of outwardly extending teeth 110 such that each end 108 is similar to a gear. As shown in the FIGS., the end 108 of the first arm 104 of the connection member 102 associated with a first lever 82 is arranged adjacent the end 108 of a second arm 106 of the connection member 102 associated with a second lever 82 of the cutting assembly 60. As shown, the teeth 110 of the adjacent ends 108 are disposed in interleaving engagement, such that rotation of a connection member about a respective axis (coupled to a first lever 82) drives a similar rotation of a second connection member, coupled to another lever 82, about its respective axis. Through this arrangement, opening or closing of one lever 82 will create a corresponding opening or closing of the other lever 82. Although the connectors 80 in each of the embodiments illustrated and described herein is an "over-center latch," other types of connections for coupling the cutting assembly 60 to the container 40 are contemplated herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Exemplary embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cap for closing a container, the cap comprising:
    a cap body for contacting an open end of the container; and
    at least one connector mounted to an exterior of said cap body for coupling said cap body to the container, said at least one connector including a lever and an engaging piece having a contact surface,
    wherein an initial movement of said at least one connector causes said engaging piece to contact both a sidewall of the container and a lip of the container, and a contour of the contact surface is complementary to a contour of the sidewall, and
    wherein a further movement of said at least one connector causes said engaging piece to affix said cap body to the container.

2. The cap according to claim 1, wherein when the cap is attached to the container, said cap body seals said open end of the container.

3. The cap according to claim 1, wherein said connector is rotatable about an axis oriented generally perpendicular to the container.

4. The cap according to claim 1, wherein said lever is operably coupled to said engaging piece such that rotation of said lever causes a similar rotation of said engaging piece.

5. The cap according to claim 4, wherein said engaging piece includes a flange and said flange defines said contoured contact surface.

6. The cap according to claim 5, wherein said flange is integrally formed with said lever.

7. The cap according to claim 5, wherein said flange is indirectly connected to said lever via a linkage.

8. The cap according to claim 5, wherein said flange is pivotally mounted to said lever.

9. The cap according to claim 5, wherein said contoured contact surface of said flange extends about ninety degrees of a periphery of the container.

10. The cap according to claim 1, wherein a diameter of said cap body is similar to said first end of the container.

11. A food processing system comprising:
    a food processing base;
    a container having a first open end and a second closed end; and
    a cutting assembly connectable to said first open end of the container, the cutting assembly being mountable to the food processing base to associate the container with the food processing base, the cutting assembly including:
        a body for contacting said open end of the container; and
        at least one connector mounted to an exterior of said body for coupling said body to said container, said at least one connector including an engaging piece and a lever, said engaging piece includes a flange with a contoured surface, complementary to an exterior surface of said container; wherein an initial movement of said at least one connector causes said engaging piece to contact said container, and a lip formed about said container, and
        wherein a further movement of said at least one connector causes said engaging piece to affix said body to said container.

12. The food processing system according to claim 11, wherein said connector is rotatable about an axis oriented generally perpendicular to the container.

13. The food processing system according to claim 11, wherein said contoured surface of said flange extends about ninety degrees of a periphery of said container.

14. The food processing system according to claim 11, wherein said lever is operably coupled to said engaging piece such that rotation of said lever causes a similar rotation of said engaging piece.

15. The food processing system according to claim 11, wherein said cutting assembly further includes at least one blade rotatable about an axis mounted to said body, said at least one blade being positioned within said container when said cutting assembly is coupled to said container.

16. The food processing system according to claim 15, wherein rotation of said at least one blade is driven by said food processing base.

* * * * *